(12) United States Patent
Groll et al.

(10) Patent No.: US 9,234,786 B2
(45) Date of Patent: Jan. 12, 2016

(54) SYSTEM FOR ANALYSIS OF THE CONDITION OF THE RUNNING GEAR OF RAIL VEHICLES

(75) Inventors: Peter Groll, Darmstadt (DE); Ralph Mueller, Darmstadt (DE)

(73) Assignee: Schenck Process GmbH, Darmstadt (DE)

( * ) Notice: Subject to any disclaimer, the term of this patent is extended or adjusted under 35 U.S.C. 154(b) by 840 days.

(21) Appl. No.: 13/125,840

(22) PCT Filed: Nov. 17, 2009

(86) PCT No.: PCT/EP2009/008151
§ 371 (c)(1),
(2), (4) Date: Jun. 3, 2011

(87) PCT Pub. No.: WO2010/057609
PCT Pub. Date: May 27, 2010

(65) Prior Publication Data
US 2011/0224863 A1    Sep. 15, 2011

(30) Foreign Application Priority Data

Nov. 19, 2008 (DE) .......................... 10 2008 058 244

(51) Int. Cl.
| | |
|---|---|
| *G01M 17/007* | (2006.01) |
| *G06F 19/00* | (2011.01) |
| *G01L 1/10* | (2006.01) |
| *G01G 19/04* | (2006.01) |

(52) U.S. Cl.
CPC .................................... *G01G 19/047* (2013.01)

(58) Field of Classification Search
CPC ........... B61K 9/12; B61K 9/04; G01M 17/10; G01M 17/013; G01M 17/08; G01M 13/045
USPC .......... 701/29; 73/146, 659, 862.59; 246/120, 246/122 R, 169 S
See application file for complete search history.

(56) References Cited

U.S. PATENT DOCUMENTS

| | | | |
|---|---|---|---|
| 4,103,548 A * | 8/1978 | McDonald | 73/146 |
| 4,439,342 A | 3/1984 | Albanese | |
| 4,843,885 A * | 7/1989 | Bambara | 73/660 |
| 6,216,985 B1 * | 4/2001 | Stephens | 246/120 |

(Continued)

FOREIGN PATENT DOCUMENTS

| | | |
|---|---|---|
| DE | 39 37 318 C1 | 5/1991 |
| DE | 198 58 937 A1 | 6/2000 |

(Continued)

OTHER PUBLICATIONS

"German Office Action for German Application No. 10 2008 058 244.1-52", Aug. 22, 2009, Publisher: German Patent Office, Published in: DE.

(Continued)

*Primary Examiner* — Mussa A Shaawat
*Assistant Examiner* — Kyung Kim
(74) *Attorney, Agent, or Firm* — Muncy, Geissler, Olds & Lowe, P.C.

(57) ABSTRACT

The object to create a system and a method which allows better running gear diagnosis of rail vehicles is achieved by the present invention by arranging a number of force measurement devices on the rail measurement zone to detect the forces and/or torques acting on the rail measurement zone, such that the system also comprises a number of sonic measurement devices for detecting the sound waves which occur when the rail vehicle travels over the rail measurement zone. The present invention thus offers a diagnostic system for analysis of the condition of wheel bearings and wheel geometries in particular in which the forces and sound waves occurring when the rail vehicle travels over the rail can be detected and analyzed, so that more reliable inferences about the condition of the running gear of the rail vehicle can be drawn from them.

14 Claims, 3 Drawing Sheets

(56) References Cited

U.S. PATENT DOCUMENTS

| | | | |
|---|---|---|---|
| 6,405,141 B1 * | 6/2002 | Carr et al. | 702/36 |
| 6,951,132 B2 | 10/2005 | Davenport et al. | |
| 7,278,305 B2 | 10/2007 | Kilian et al. | |
| 7,681,443 B2 * | 3/2010 | Kilian et al. | 73/146 |
| 2004/0261533 A1 * | 12/2004 | Davenport et al. | 73/659 |
| 2006/0010971 A1 * | 1/2006 | Kilian et al. | 73/146 |
| 2007/0064244 A1 * | 3/2007 | Mian et al. | 356/601 |

FOREIGN PATENT DOCUMENTS

| | | |
|---|---|---|
| DE | 199 13 057 A1 | 9/2000 |
| DE | 100 57 740 A1 | 5/2002 |
| DE | 103 05 470 A1 | 8/2004 |
| DE | 10 2006 015 924 A1 | 10/2007 |
| EP | 1 847 819 A2 | 10/2007 |
| GB | 2 221 301 A | 1/1990 |

OTHER PUBLICATIONS

"International Preliminary Report on Patentability for International Application No. PCT/EP2009/008151", Dated: Jan. 24, 2011, Publisher: EPO, Published in: EP.

"International Search and Written Report for International Application No. PCT/EP2009/008151", Dated: Jan. 18, 2010, Publisher: EPO, Published in: EP.

* cited by examiner

SYSTEM FOR ANALYSIS OF THE CONDITION OF THE RUNNING GEAR OF RAIL VEHICLES

FIELD OF THE INVENTION

The invention relates in general to the technical field of rail vehicles as well as a system for analyzing the condition of the running gear of rail vehicles. The invention relates in particular to a system and a method for analysis of the condition of the running gear of rail vehicles by detecting loads which occur in wheel/rail contact with rail vehicles.

BACKGROUND OF THE INVENTION

There are already known systems in which a measurement zone is set up on a rail, e.g., from the document DE 10 2006 015 924 A1. With these known systems, a plurality of measurement devices is arranged beneath the rail in the longitudinal direction of the rail to detect the forces acting on the rail. By means of these measurement devices, the forces or torques occurring when the rail vehicle travels over the rail can be measured in the body of the track. However, such known systems are limited to measuring the forces or torques occurring in the rail, which allows only a limited diagnosis with respect to the condition of the running gear of the rail vehicle. With these systems, for example, it is thus possible to detect flat spots on wheels of rail vehicles, but this can only be done with a quality statement which is derived merely from the force measurement technique. Therefore, statements about the geometric properties of the flat spots are possible only to a limited extent.

Furthermore, there are also known systems for detecting overheated axle bearings of rail vehicles, also known as hot box detectors, in the state of the art. However, such systems have the disadvantage that they are able to detect bearing damage to the wheel or axle bearing on the rail vehicle only when the condition of the vehicle of the rail vehicle is already relatively critical.

The known hot box detectors are usually based on the principle of infrared measurement technology and can thus supply information about possible bearing damage only by way of a temperature difference measurement. For maintenance on rail vehicles as well as rail operators the hit ratio and the reliability of accurate information of diagnostic systems about the condition of the running gear of rail vehicles are of crucial importance.

SUMMARY OF THE INVENTION

The object of the present invention is therefore to create a system and a method which will allow better diagnosis with respect to the condition of the running gear of a rail vehicle.

The present invention solves this problem through a system for analysis of the condition of the running gear of rail vehicles, in which a number of force measurement devices for detecting the forces and/or torques acting on the rail measurement zone are arranged on a rail measurement zone, characterized in that the system also comprises a number of sonic measurement devices for detecting the sound waves which occur when the rail vehicle travels over the rail measurement zone.

According to another aspect of the present invention a method of analyzing the condition of the running gear of rail vehicles by means of a rail measurement zone comprising the following steps is made available:

A rail vehicle travels over a rail measurement zone;
The forces and/or torques acting on the rail measurement zone, said forces and torques occurring when the rail vehicle travels over the rail measurement zone, are detected by means of a number of force measurement devices,
The sound waves generated when the rail vehicle travels over the rail measurement zone are detected by means of a number of sonic measurement devices, and
The electric measurement signals supplied by the force measurement devices and the sonic measurement devices are analyzed to draw conclusions regarding the condition of the running gear of the rail vehicle.

For the reliability of the diagnosis, it is advantageous in particular if the detection of the forces and/or torques in the rail measurement zone and the detection of the sound waves are performed simultaneously. Such simultaneously detected measurement signals may then be correlated with one another and superimposed so that force measurement signals and sonic measurement signals detected simultaneously when a rail vehicle travels over the rail measurement zone can be brought into a direct chronological correlation with one another and can be analyzed in parallel with one another. Then inferences about the condition of the running gear of the rail vehicle can be drawn via the analysis of the mutually correlated force measurement signals and sonic measurement signals.

The present invention thus presents a system and a method for measuring loads in wheel/rail contact of rail vehicles in which the forces occurring in the body of the track due to the rail vehicle traveling over the track as well as the resulting acoustic sound waves are detected and analyzed for whether they permit inferences about the condition of the running gear of the rail vehicle to be drawn. Consequently, a mechanical/acoustic measurement system with which bearing damage on trains can be detected at an early point in time can be provided with the present invention.

Thus the present invention offers a diagnostic system for analyzing the condition of a running gear of a rail vehicle, in particular the wheel bearing and wheel geometries with which the loads and noises occurring due to a rail vehicle traveling over the rail can be detected and analyzed, so that more reliable inferences about the condition of the running gear of the rail vehicle, for example, the wheel bearing and the wheel geometry, can be drawn.

Better information about imperfections with respect to wheel roundness or bearing damage on the running gear of a rail vehicle can be obtained with the present invention. The present invention therefore constitutes an optimization for monitoring of the functional reliability of the running gear of a rail vehicle, including its wheels and wheel bearings. Direct information about damage sites and problems with the geometry of wheels or possible bearing damage to the running gear of rail vehicles can therefore be obtained.

In addition to the force and/or torques introduced into the rails when a rail vehicle travels over the body of the track, the present invention also takes into account the resulting noise in that it detects this noise and processes it in a corresponding electronic analysis unit. In this way, the present invention is making use of acoustic measurement technology and combining it with force measurement technologies to achieve more reliable results in diagnosing the running gear of a rail vehicle with hot box detectors and/or flat spot detecting systems.

The present invention therefore comprises the following essential aspects:
Combination of acoustic measurement technology with force measurement technology (e.g., WheelScan).

In the area of at least one wheel circumference inspected, these physical parameters are detected in time synchronization and their correlation is used for optimized statement with regard to imperfections.

The regions monitored and/or detected acoustically may comprise in particular the region of contact geometry, i.e., in contact between rail and wheel and/or the axle bearings and/or wheel bearings.

According to one embodiment of the present invention, the processing of the acoustic signals and the force measurement signals may comprise, for example, correlation of the acoustic signals with the force measurement signals. Additionally or alternatively, the processing of the acoustic measurement signals and the force measurement signals may also comprise the correlation of various acoustic measurement signals recorded by various microphones. Furthermore, the processing of the acoustic and force measurement signals may also comprise the correlation of various force measurement signals recorded by various force measurement devices.

According to another embodiment of the present invention, a number of sonic measurement devices are embodied as directional microphones having a certain directional characteristic. The directional microphone is equipped with an interference tube, for example, which receives primarily the sound arriving frontally and thereby imparts a directional characteristic to the microphone. The sound from other directions is therefore attenuated to a greater extent and is detected to a lesser extent than the sound arriving at the front from the longitudinal direction of the interference tube.

A plurality of sonic measurement devices may advantageously be arranged in the longitudinal direction of the rail measurement zone in order to detect the development of the sound several times at different locations along the rail measurement zone as the rail vehicle travels over the rail measurement zone. The sonic measurement devices may be arranged next to the rail measurement zone at a certain angle with respect to the longitudinal direction of the rail measurement zone in order to detect the sound waves propagating at a right angle from the rail measurement zone.

Furthermore, at least one measurement device may be equipped for detecting the acoustic sound waves across the longitudinal direction of the rail measurement zone in order to detect the sound waves propagating almost parallel to the longitudinal direction of the rail measurement zone or at an oblique angle from the rail measurement zone. In this way at least one first directional microphone is oriented across the orientation of a second directional microphone.

In one embodiment according to the invention, at least one sound measuring device is arranged at the level of the wheel/rail contact and at least one sound measuring device is arranged at the height of a wheel bearing of the rail vehicle. The sound waves occurring in the wheel bearing as the rail vehicle travels over the rail can therefore be detected largely independently and separately from the sound waves occurring at the wheel/rail contact.

Accordingly, in one embodiment of the present invention, the directional microphones may be oriented so that they detect the sound waves which occur due to the rail vehicle traveling over the rail measurement zone
  at the wheel/rail contact between a wheel of the rail vehicle and the rail measurement zone and/or
  on the wheel bearing of the rail vehicle.
This facilitates the subsequent analysis of the sound waves with regard to analysis of the condition of the wheel bearing and the wheel geometries on the running gear of the rail vehicle.

Additionally or alternatively, structure-borne sound microphones may also be used directly on the rail of the rail measurement zone for the sound emissions in the wheel/rail contact area. Furthermore, acceleration pickups may be provided to detect the accelerations occurring in one or both rails when the rail vehicle travels over the rail measurement zone.

The force measurement devices are used to detect the forces and/or torques which are introduced into the body of the track when the rail vehicle travels over the rail measurement zone. It is particularly advantageous when a number for force measurement devices are arranged beneath the base of a rail and/or between the base of the rail and the bed of the rail of the rail measurement zone because the forces and torques acting in the rail can be reliably detected at this location.

Force measurement devices for detecting the forces or torques acting on the rail in the perpendicular direction may be provided and/or force measurement devices for detecting the forces or torques acting on the rail in the horizontal direction may be provided. The accuracy of the measurement can be supported if at least one force measurement device for detecting the forces and/or torques acting on the rail is arranged at a number of neighboring railroad ties of the rail measurement zone.

The force measurement devices and sonic measurement devices convert the forces and/or torques detected and/or the sound waves detected into electric signals which are relayed to the analysis unit over appropriate lines. The analysis unit comprises electronic means, which are preferably designed so that they can correlate the electric measurement signals supplied by the force measurement devices and the sonic measurement devices with one another, superimpose them and analyze them to thereby draw inferences about the condition of the running gear of the rail vehicle. Corresponding compensation algorithms may also be implemented here to prevent false alarms. Such compensation algorithms may be applied to the electric measurement signals supplied by the force measurement devices and the sonic measurement devices so that false alarms and/or misinterpretation of the measurement signals can be prevented.

BRIEF DESCRIPTION OF THE DRAWINGS

The present invention is explained in greater detail below on the basis of exemplary embodiments and the accompanying drawings. With regard to the drawings.

DETAILED DESCRIPTION

Figure 1:
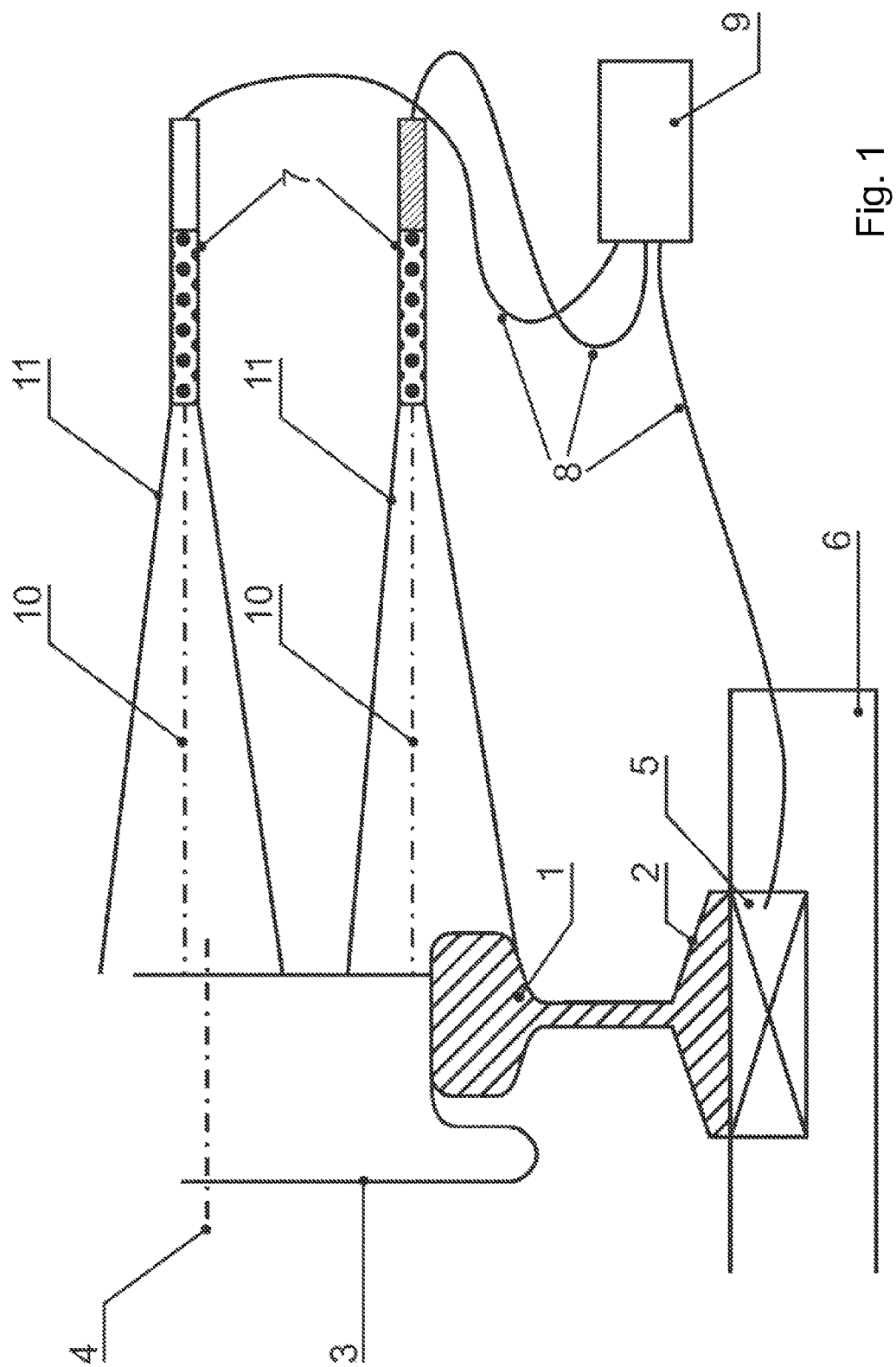
FIG. 1 shows a schematic sectional diagram of a system according to one embodiment of the present invention for analysis of the running gear of rail vehicles by measuring forces and/or sound waves generated by a rail vehicle traveling over a rail.

FIG. 1 shows a sectional diagram through a schematic design of a system according to one embodiment of the present invention for analysis of the condition of the running gear of rail vehicles by measuring forces and/or sound waves generated by a vehicle traveling over a rail. The system according to the invention comprises a rail measurement zone having a track body, of which a rail 1 is shown in a cross section with hatching. The wheel 3 of a rail vehicle (not shown) stands on the rail 1 and rolls over the rail 1 when the rail vehicle is traveling at a right angle to the plane of the paper. In doing so the wheel 3 rotates about its axis 4, which at the same time represents the wheel bearing schematically.

The rail has a base 2 which is supported on a railroad tie or a rail bed 6 via a force measurement device 5. The force measurement device 5 is thus located between the foot of rail 2 and the rail bed and/or the railroad tie 6, so that the force measurement device 5 can transfer all the forces and torques due to loads caused by a rail vehicle traveling over the rail.

The force measurement device 5 may be, for example, a force measurement cell such as that known fundamentally from the document DE 39 37 318 A1. Deformation parts are reversibly deformed in a force measurement cell under the influence of the force to be measured so that the electric resistance of wire strain gauges mounted on the deformation parts changes, which can be detected as a measured value. This measured value can be relayed as an electric signal to a corresponding analysis unit.

In the exemplary embodiment shown in FIG. 1, the forces and torques acting on the rail 1 and/or in the foot of rail 2 are measured by the force measurement cell 5 and converted into electric signals which are relayed via a signal line 8 to analysis unit 9. The system according to the invention also comprises a number of sonic measurement devices 7, which detect the sound waves occurring when the rail vehicle travels over the rail.

Directional microphones having a certain directional characteristic such as those indicated with a certain orientation 10 and through corresponding directional cones 11 in FIG. 1 may be used as the sonic measurement devices 7 which are mechanically uncoupled from the rail measurement zone. The directional microphone 7 comprises, for example, an interference tube which picks up primarily the sound arriving frontally and thus detects the sound from other directions to a lesser extent than the sound arriving from the front in the longitudinal direction of the interference tube. In the exemplary embodiment shown in FIG. 1, two directional microphones 7 are shown, the lower directional microphone 7 of which is arranged at the height of the wheel/rail contact and the upper directional microphone 7 of which is arranged at the height of a wheel bearing 4 of the rail vehicle.

The upper directional microphone 7 is oriented so that it detects sound waves occurring in the wheel bearing 4 as represented by the orientation 10 of the upper directional microphone 7 in the direction of the wheel bearing 4. The lower directional microphone 7 is oriented so that it detects the sound waves occurring on contact between the wheel 3 and the rail 1, as represented by the orientation 10 of the lower directional microphone 7 in the direction of the wheel/rail contact. Additionally or alternatively, structure-borne sound microphones or acceleration pickups mounted directly on the rail may also be used here.

Therefore the sound waves occurring in the wheel bearing 4 when the rail vehicle travels on the rail are detected simultaneously and mostly separately from the sound waves occurring at the point of contact between the wheel 3 and the rail 1.

Like the electric measurement signals generated by the force measurement devices 5, the electric measurement signals generated by the sonic measurement devices 7 are also relayed via corresponding signal lines 8 to the analysis unit 9. The analysis unit 9 comprises electronic means which are preferably designed so that they are able to correlate and analyze the electrical measurement signals with one another to thereby draw inferences about the condition of the running gear of the rail vehicle. Differentiated statements about the condition of the wheel bearing 4 or about the geometry of the wheel 3 can be made on the basis of the separate measurement of the sound waves occurring at the wheel/rail contact and the sound waves occurring in the wheel bearing 4.

Figure 2:
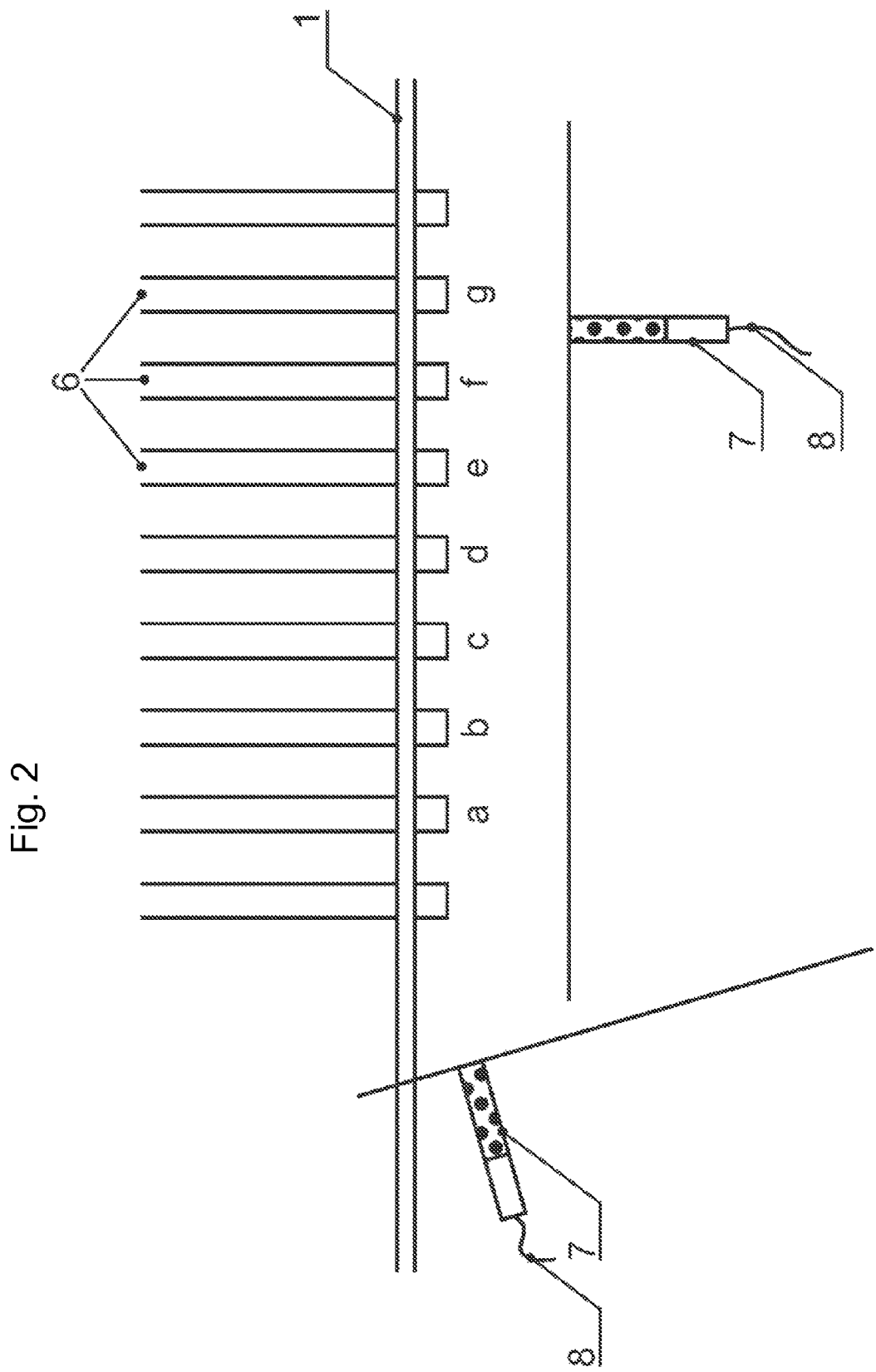
FIG. 2 shows a schematic diagram of the structure of a system according to another embodiment of the present invention for analysis of the running gear of rail vehicles by measuring forces and/or sound waves generated by a rail vehicle traveling over a rail.

FIG. 2 shows a schematic diagram of the structure of a system according to another embodiment of the present invention for analysis of the condition of the running gear by measurement of forces and/or acoustic signals generated by a rail vehicle traveling over a rail 1. As in the embodiment shown in FIG. 1, only one rail 1 is shown in the embodiment illustrated in FIG. 2, this time shown in a view from above, supported on a plurality of railroad ties a-g.

The accuracy of the measurement can be supported if at least one force measurement device 5 for detecting the forces and/or torques acting on the rail is arranged on a number of neighboring railroad ties a-g of the rail measurement zone. Separate force measuring devices may also be provided on the rail 1 for detecting the forces or torques acting vertically on the rail 1 and/or force measurement devices for detecting the forces or torques acting horizontally on the rail 1.

According to the invention, the measurement signals supplied by the force measuring devices 5 are correlated with one another and/or superimposed and/or compensated with the measurement signal supplies by the sound measuring devices 7 in order to support the reliability of the analytical results to be able to make more accurate and more reliable statements about to wheel geometry, wheel roundness, imperfections, wheel damage or bearing damage to the running gear of the rail vehicle.

In the embodiment shown in FIG. 2, two sound measuring devices and/or directional microphones 7 are also arranged side by side in the longitudinal direction of the rail measurement zone to detect acoustically the development of sound when the rail vehicle travels over the rail measurement zone from two different directions. For this purpose, the sonic measurement devices and/or directional microphones 7 are arranged next to the rail measurement zone at a certain angle with respect to the longitudinal direction of the rail measurement zone.

The directional microphone 7 shown at the right of FIG. 2 is oriented at a right angle to the longitudinal direction of the rail measurement zone in order to detect such sound waves that propagate at a right angle from the rail measurement zone. The directional microphone 7 shown in the left portion of FIG. 2 is oriented across the longitudinal direction of the rail measurement zone in order to detect the sound waves propagating almost in parallel with the longitudinal direction of the rail measurement zone or only at an oblique angle to the rail measurement zone. In this way, the one directional microphone 7 is oriented across the orientation of the other directional microphone 7.

The electrical measurement signals generated by the force measurement devices (not shown in FIG. 2) and by the sonic measurement devices 7 are in turn relayed via the connected signal lines 8 to the analysis unit 9, where the signals are correlated with one another and/or superimposed through the electronic means of the analysis unit 9 so that bearing damage or unevenness in the running area of the wheel, for example, can be detected in this way. The correlation up to acoustic measurement signals picked up from different directions may lead to further detail findings of the damage pattern detected and may be used for a more reliable differentiation between wheel damages or wheel bearing damages.

Figure 3:
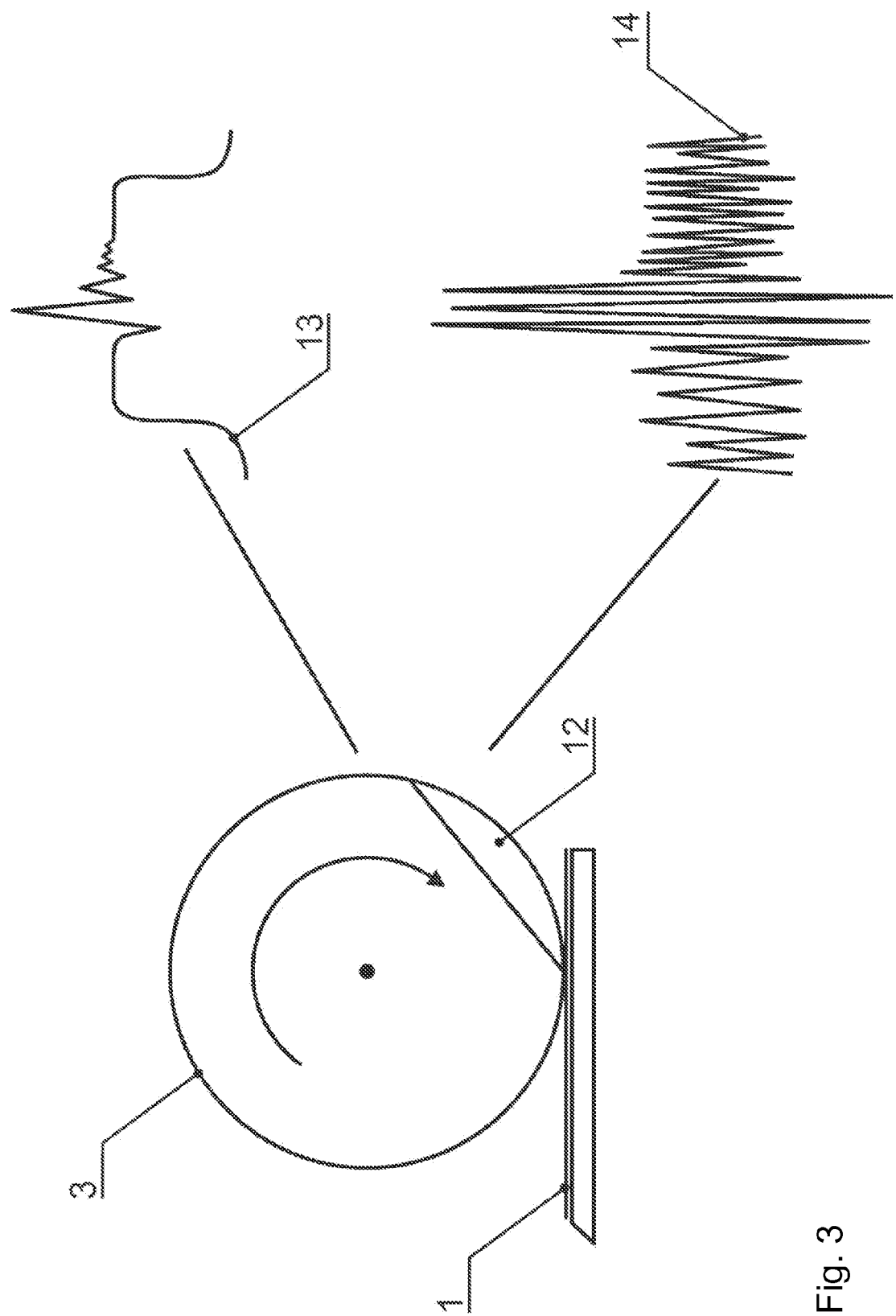
FIG. 3 shows a schematic diagram of a damaged rail vehicle wheel and the acoustic and force measurement signals detected by means of a measurement according to the present invention.

FIG. 3 shows a schematic diagram of a damaged rail vehicle wheel and a schematic diagram of the acoustic measurement signals and force measurement signals detected by means of a measurement system according to the present invention.

The left part of FIG. 3 shows the wheel 3 of a rail vehicle rolling on a rail 1 in the direction of the rotating arrow. The wheel 3 has an imperfection, i.e., a flat spot 12 on its outer radial running area which should be detected by the analysis system according to the invention. As soon as the flat spot 12 rolls over the rail 1 it generates corresponding forces and/or torques in the rail 1 which are detected by force measurement devices beneath the rail 1. Furthermore, a noise development whose sound waves are detected by sonic measurement devices is generated as the wheel with the flat spot 12 rolls over the rail 1.

The right part of FIG. 3 shows a signal curve of the force measurement signal 13 and a signal curve of the acoustic measurement signal 14, each shown schematically. The signal curves 13 and 14 show that there is a rather larger deflection in the middle of the signal, which occurs when the flat spot 12 of the wheel 3 rolls over the rail 1. Before and after this rather large deflection in time, only smaller amplitudes reflecting normal rolling of the wheel 3 on the rail 1 are detected. Through the correlation or superpositioning of the force measurement signal 13 with the acoustic measurement signal 14 according to the invention, more reliable information about the position, the type and extent of a wheel damage or wheel bearing damage can be made.

To do so, the measurement signals generated by the force measurement devices 5 and the sonic measurement devices 7 are relayed to the analysis unit, which comprises electronic means to enable correlation of the electric measurement signals with one another, superimposing them and/or compensating and analyzing them and drawing inferences from them about the condition of the running gear of the rail vehicle. Because of the separate measurement of the forces introduced into the rail 1 by means of force measurement devices 5 and the simultaneous measurement of the sound waves occurring at the wheel/rail contact as well as the sound waves occurring in the wheel bearing by means of the sonic measurement device 7, differentiated information about the condition of the wheel bearing 4 or about the geometry of the wheel 3 can be obtained.

The system with the measurement zone according to the invention can be integrated into a real track body for rail vehicles in a particularly practical manner. In this way, running rail vehicles can be checked for the condition of their running gear during use without any negative effects or interruptions in the driving operation during operation. When an inadequate wheel or wheel bearing condition is detected, the respective rail vehicle could be sent promptly for the proper maintenance without the possibility of an accident-induced interruption in operation or even leading to a critical condition of the running gear.

Although certain exemplary embodiments are described in detail in the present description and are illustrated in the accompanying drawings, such embodiments are to be understood as being merely illustrative and are not to be interpreted restrictively for the scope of protection of the invention. It is therefore pointed out that various modifications in the embodiments of the invention described or illustrated or otherwise shown can be made without going beyond the scope of protection and the core of the invention.

LIST OF REFERENCE NOTATION

1 Rail
2 Foot of rail
3 Wheel of a rail vehicle
4 Axis of rotation and wheel and wheel bearing
5 Force measurement device
6 Rail bed and/or railroad tie
7 Sonic measurement device and/or directional microphones
8 Signal lines
9 Electronic analysis unit
10 Orientation of the directional microphones, directional cone
11 Directional cone of the directional microphones
12 Flat spot on wheel
13 Force measurement signal curve
14 Acoustic measurement signal curve

What is claimed is:

1. A system for analyzing conditions of a running gear of rail vehicles, the system comprising:
   a number of force measurement devices for detecting forces and/or torques acting on a rail measurement zone, wherein the force measurement devices are arranged on the rail measurement zone,
   a plurality of sonic measurement devices for detecting sound waves that occur when the rail vehicle travels over the rail measurement zone, and
   an analysis unit configured to correlate electrical measurement signals supplied simultaneously by the force measurement devices and sonic measurement devices with one another and superimpose the electrical measurement signals to thereby draw inferences about the conditions of the running gear of the rail vehicle.

2. The system according to claim 1, wherein the plurality of sonic measurement devices are arranged side by side in a longitudinal direction of the rail measurement zone.

3. The system according to claim 1, wherein the plurality of sonic measurement devices are arranged at a certain angle with respect to a longitudinal direction of the rail measurement zone at the side of the rail measurement zone.

4. The system according to claim 1, wherein at least one measurement device for detecting sound waves is oriented across a longitudinal direction of the rail measurement zone, and at least one measurement device for detecting the sound waves is oriented substantially parallel to the longitudinal direction of the rail measurement zone.

5. The system according to claim 1, wherein at least one sonic measurement device is arranged at the height of a wheel/rail contact, and at least one sonic measurement device is arranged at the height of a wheel bearing of the rail vehicle.

6. The system according to claim 1, wherein a number of acceleration pickups are provided for detecting accelerations in the rail measurement zone that occur when the rail vehicle travels over the rail measurement zone.

7. The system according to claim 6, wherein at least one first directional microphone is oriented across the orientation of a second directional microphone.

8. The system according to claim 6, wherein a first directional microphone and a second directional microphone are oriented to detect sound waves that occur when the rail vehicle travels over the rail measurement zone at:
   a wheel/rail contact between the wheel of the rail vehicle and the rail measurement zone, and/or
   on a wheel bearing of the rail vehicle.

9. The system according to claim 1, wherein at least one force measurement device for detecting the forces and/or torques acting on the rail is arranged on each of a number of neighboring railroad ties of the rail measurement zone.

10. The system according to claim 1, wherein force measurement devices for detecting the forces and/or torques acting on a rail in a vertical direction and/or in a horizontal direction are provided.

11. The system according to claim 1, wherein the system having the rail measurement zone is configured to be integrated into a real track body for rail vehicles.

12. A method for analyzing conditions of a running gear of rail vehicles in a rail measurement zone comprising the following steps:
- having a rail vehicle travel over the rail measurement zone;
- detecting forces and/or torques that act on the rail measurement zone when the rail vehicle travels over the rail measurement zone, by a number of force measurement devices;
- detecting sound waves occurring when the rail vehicle travels over the rail measurement zone, by a number of sonic measurement devices, wherein the sonic measurement devices are directional microphones having a certain directional characteristics that are mechanically uncoupled from the rail measurement zone; and
- analyzing electrical measurement signals supplied by the force measurement devices and the sonic measurement devices to draw inferences about the condition of the running gear of the rail vehicle therefrom, wherein the forces and/or torques in the rail measurement zone are detected and detection of the sound waves is performed concurrently, wherein the analyzing includes:
- correlating and superimposing the electrical measurement signals supplied by the force measurement devices and the sonic measurement devices; and
- analyzing the correlation between the electrical measurement signals supplied by the force measurement devices and the sonic measurement devices to thereby draw inferences about the condition of the running gear of the rail vehicle.

13. The method according to claim 12, wherein the detection of the forces and/or torques in the rail measurement zone and the detection of the sound waves are performed in time synchronization and over at least one complete circumference of a rail vehicle wheel.

14. The method according to claim 12 further comprising the step of:
- applying compensation algorithms to the electrical measurement signals supplied by the force measurement devices and the sonic measurement devices to prevent misinterpretation of the electrical measurement signals.

* * * * *